(12) United States Patent
Kumar (10) Patent No.: US 7,738,443 B2
(45) Date of Patent: Jun. 15, 2010

(54) ASYNCHRONOUS BROADCAST FOR ORDERED DELIVERY BETWEEN COMPUTE NODES IN A PARALLEL COMPUTING SYSTEM WHERE PACKET HEADER SPACE IS LIMITED

(75) Inventor: Sameer Kumar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/768,619

(22) Filed: Jun. 26, 2007

(65) Prior Publication Data

US 2009/0003344 A1    Jan. 1, 2009

(51) Int. Cl.
    *H04L 12/56*    (2006.01)
(52) U.S. Cl. ...................... 370/351; 709/245
(58) Field of Classification Search ........................ None
    See application file for complete search history.

(56) References Cited

U.S. PATENT DOCUMENTS

| | | | | |
|---|---|---|---|---|
| 5,917,828 | A * | 6/1999 | Thompson | 370/474 |
| 6,324,495 | B1 * | 11/2001 | Steinman | 703/17 |
| 6,647,428 | B1 * | 11/2003 | Bannai et al. | 709/245 |
| 6,894,978 | B1 * | 5/2005 | Hashimoto | 370/238 |
| 2002/0129086 | A1 * | 9/2002 | Garcia-Luna-Aceves et al. | 709/200 |

OTHER PUBLICATIONS

Almasi, Gheorghe, et al. "MPI on BlueGene/L: Designing an Efficient General Purpose Messaging Solution for a Large Cellular System," IBM Research Report RC22851 (W037-150) Jul. 22, 2003.
Almasi, Gheorghe, et al., "Optimization of MPI Collective Communication on BlueGene/L Systems," ICS'05, Jun. 20-22, 2005, Boston, MA.
Gara, A., et al., "Overview of the Blue Gene/L system architecture," IBM J. Res. & Dev., vol. 49, No. 2/3, Mar./May 2005, pp. 195-212.
Huang, Chao, et al., "Performance Evaluation of Adaptive MPI," PPoPP'06, Mar. 29-31, 2006, New York, New York.
MPI (Message Passing Interface) standards documents, errata, and archives http://www.mpi-forum.org visited Jun. 16, 2007 (Sections 4.2, 4.4 and 10.4).

* cited by examiner

*Primary Examiner*—Huy Vu
*Assistant Examiner*—Benjamin Lamont
(74) *Attorney, Agent, or Firm*—Scully, Scott, Murphy & Presser, P.C.; Daniel P. Morris, Esq.

(57) ABSTRACT

Disclosed is a mechanism on receiving processors in a parallel computing system for providing order to data packets received from a broadcast call and to distinguish data packets received at nodes from several incoming asynchronous broadcast messages where header space is limited. In the present invention, processors at lower leafs of a tree do not need to obtain a broadcast message by directly accessing the data in a root processor's buffer. Instead, each subsequent intermediate node's rank id information is squeezed into the software header of packet headers. In turn, the entire broadcast message is not transferred from the root processor to each processor in a communicator but instead is replicated on several intermediate nodes which then replicated the message to nodes in lower leafs. Hence, the intermediate compute nodes become "virtual root compute nodes" for the purpose of replicating the broadcast message to lower levels of a tree.

19 Claims, 6 Drawing Sheets

ASYNCHRONOUS BROADCAST FOR ORDERED DELIVERY BETWEEN COMPUTE NODES IN A PARALLEL COMPUTING SYSTEM WHERE PACKET HEADER SPACE IS LIMITED

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, U.S. patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTI-PROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768/697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTI-PROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE MULTIPROCESSOR COHERENCE REQUESTS FOR DEBUGGING A MULTI-PROCESSOR"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768, 795, for "DMA ENGINE FOR REPEATING COMMUNICATION PATTERNS"; U.S. patent application Ser. No. 11/768,799, for "METHOD AND APPARATUS FOR GRANTING PROCESSOR ACCESS TO A RESOURCE "; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A system and method for PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to parallel computing system and, more particularly, to a novel technique for asynchronous broadcasts where ordered delivery of broadcast messages is maintained between compute nodes in the parallel computing system where packet header space is limited.

2. Description of the Prior Art

To achieve high performance computing, multiple individual processors have been interconnected to work cooperatively to solve a computational problem allowing for parallel processing. In a parallel computing system multiple processors can be placed on a single chip, or several chips each containing one or several processors, embedded DRAM, system-on-chip integration, and local caches memories have been forming so-called "compute nodes" which interconnected forming a parallel computing system.

In designing high bandwidth/Floating point Operations Per Second (FLOP) parallel computing systems, such as IBM's Blue Gene/L™ it is sometimes desirable to provide a communication software architecture with low overhead for communications. For example, in Blue Gene/L™, the communication software architecture is divided into three layers; at the bottom is the packet layer, which is a thin software library that allows access to network hardware and at the top is the Message Passing Interface (MPI) library, discussed below. In between the packet layer and the MPI library layer is a single layer called the message layer that glues together the Blue Gene/L™ system. To achieve speed/efficiency of the system, a restriction is placed on the length of the packet header. In IBM's Blue Gene/L™ a packet header can only be a multiple of 32-bytes and is limited to no more than 256 bytes. The message layer is an active message system built on top of the packet layer that allows the transmission of arbitrary buffers among compute nodes with the assistance of the MPI library layer.

Parallel computer applications often use message passing to communicate between processors. The Message Passing Interface (MPI) specification is widely used for solving significant scientific and engineering problems on parallel computers and provides a simple communication API and eases the task of developing portable parallel applications. Message Passing Interface Forum, "MPI: A Message-Passing Interface Standard," University of Tennessee, 1995; see http://www-.mpi-forum.org/docs/mpi-11-html/mpi-report.html.

MPI supports two types of communication, 1) point-to-point and 2) collective. In point-to-point messaging, a processor sends a message to another processor that is ready to receive it. A point-to-point communication operation can be used to implement local and unstructured communications.

In collective communication operation many processors participate together in the communication operation. In other words, processors are collected into groups and each data packet sent from one processor to another are sent in a specific order or context and must be received in the same order or context. According to the MPI forum, contexts are further defined as providing the ability to have separate safe "universes" of message passing in MPI. Hence, a context is akin to an additional tag that differentiates messages. The parallel computer system manages this differentiation process using the MPI library. A group or context in MPI together forms a communicator, which encapsulates internal communication structures in a parallel computer system into modules. A processor is identified by its rank in the group associated with a specific communicator. Examples of collective operations are broadcast, barrier, all-to-all.

MPI implements a one-to-all broadcast operation whereby a single named processor (root) sends the same data to all other processors. In other words, MPI's broadcast operation provides a data movement routine in which all processors interact with a distinguished root processor so that each processor receives its data. At the time of broadcast call, the data to be communicated are located in a buffer in the root processor. The root processor's broadcast call consists of three arguments, the specific location of the data, the type of data and the number of elements to be sent to each destination. After the call, the data are replicated in the buffer of all processors in the communicator.

a. Synchronous Broadcast

Normally, broadcast operations are implemented in a synchronous manner where all processors arrive at the broadcast operation before any data movement can happen on the network. This is typically enforced in hardware, or in software through a barrier before each broadcast operation, which results in larger overheads for short messages. Such broadcast operations are also blocking operations.

Figure 1:
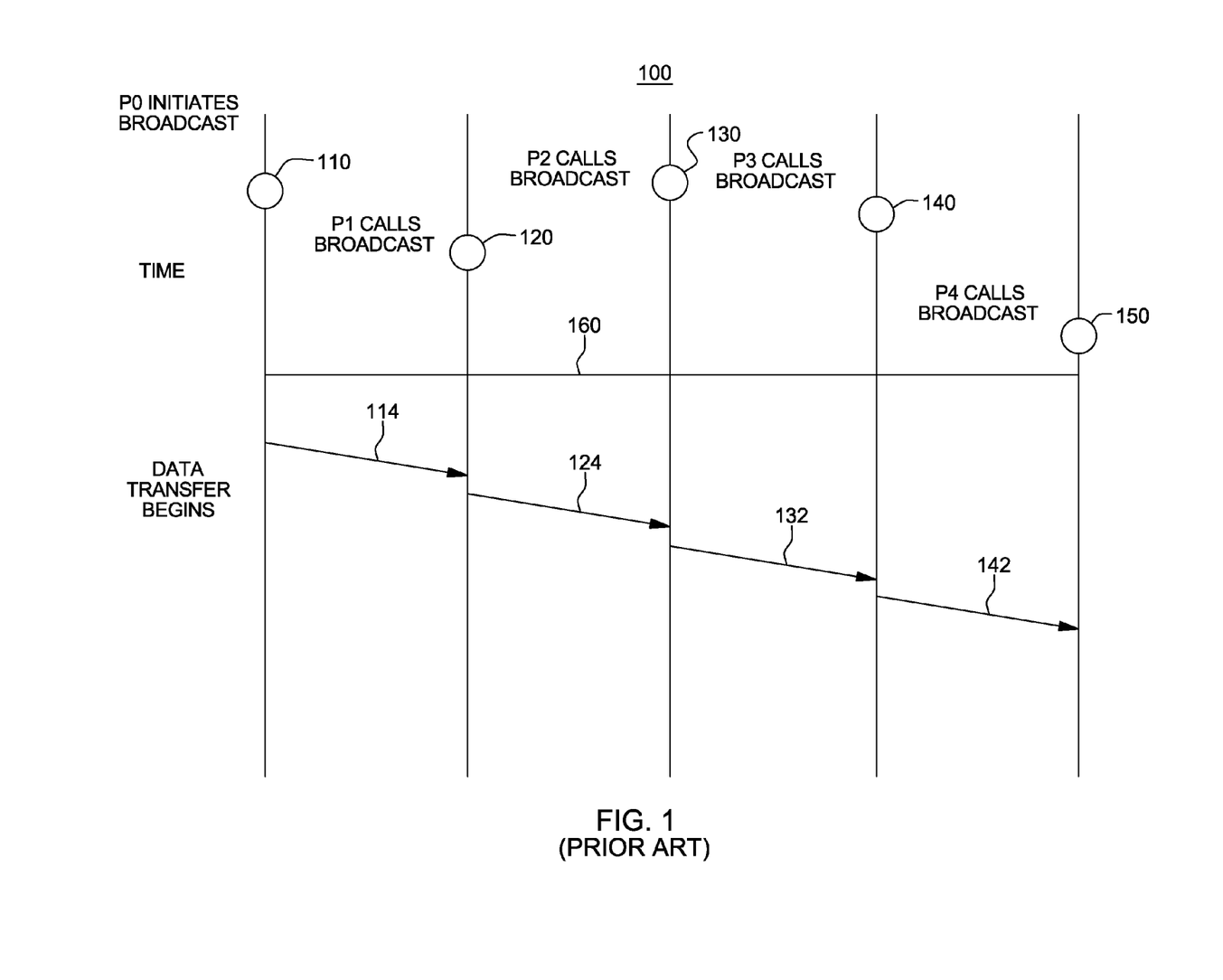
FIG. 1 is an illustration of an example of a synchronous broadcast call on a communicator, utilizing a barrier in the prior art.

FIG. 1 illustrates an example of a synchronous broadcast call on a communicator, utilizing a barrier in the prior art 100. As depicted in FIG. 1, processor 110 initiates a broadcast call and must wait to begin its data transfer 114 until all other processors in the communicator 120, 130, 140 and 150 arrive at the barrier 160. In other words, no processor leaves the barrier until all processors finish the broadcast call. Data transfer, as seen in FIG. 1 begin and arrives at various times as seen at 114, 124, 132 and 142. Accordingly, the barrier implements ordering of the packet delivery between processors as established by a communicator.

b. Asynchronous Broadcast

In an asynchronous broadcast operation, nodes freely issue broadcasts, which move on in a network independent of each other. Some programming languages and messaging APIs support a asynchronous broadcast operation in other network environments.

It is desirable to be able to provide an asynchronous broadcast operation in a parallel computer system where no synchronization would be needed between compute nodes in a communicator and data movement could begin as soon as the asynchronous broadcast is initiated. However, there is no known mechanism on the receiving compute nodes in the communicator to provide order or context to the data packets and to distinguish data packets from several incoming asynchronous broadcast messages. Moreover, since a parallel computing systems can contain hundreds of thousands of compute nodes a broadcast call would need to travel through numerous intermediate nodes to replicate the data in a root processor's buffer to all processors in a given communicator.

Having set forth the limitations of the prior art, it is clear that what is required is a technique for providing asynchronous broadcasts where ordered delivery of data packets is maintained between compute nodes in the parallel computing system where packet header space is limited such as IBM's Blue Gene/P™.

SUMMARY OF THE INVENTION

It is therefore an object of the present invention to provide a novel technique and method for providing asynchronous broadcasts where ordered delivery of data packets is maintained between compute nodes in the parallel computing system where packet header space is limited.

An additional object of the present invention is to provide a method for asynchronously broadcasting a message from a root compute node in a parallel computer system, comprising a plurality of interconnected compute nodes, to all of the other compute nodes comprising a subset of the system, the method comprising the steps of:

preparing said broadcast message by said root compute node to include a header packet and payload, the payload comprising message data; sending said prepared broadcast message by said root compute node to a group of intermediate compute nodes associated with said root compute node; reforming said packet header, upon receipt of said broadcast message by said intermediate compute nodes, and re-broadcasting said broadcast message comprising said reformed header packet and payload by said intermediate compute nodes as virtual root nodes, said broadcast message received by a group of intermediate compute nodes associated with each said virtual root nodes; and repeating the step of reforming until a last group of virtual compute nodes is connected to a group of leaf nodes that are not connected to other compute nodes.

In another embodiment of the present invention, the subset of the system is a communicator function as defined by a MPI library function and said root compute node, said intermediate compute nodes and said leaf compute node are assigned a rank number.

In another embodiment of the present invention the communicator is configured into a hierarchical structure and said hierarchical structure can be a spanning tree, a binary search tree, a heapsort or other recursive methods including iterative algorithms.

In another embodiment of the present invention, said ranks of said root compute node, said intermediate compute nodes and said leaf compute node are provided in a connection list defining a connection slot between each compute node in said subset of the system.

In another embodiment of the present invention, said step of preparing said broadcast message further comprises the steps of: packetizing a first packet header, by said root compute node, said broadcasting messages into said header packet and said payload, wherein said header packet includes said assigned root rank number, a group number; a first sequence number; packetizing a first payload, said first payload includes a root communicator number and a first sequence number; packetizing all other packet headers including said root rank number and a second sequence number.

In another embodiment of the present invention, a direct memory device (DMA) disposed within said root compute node packetizes said broadcast message.

In another embodiment of the present invention, said packet header further including a hardware header, a reserved space, a software header wherein said root rank number, said group number, and said first sequence number are inserted into said software header and said root communicator number and said sequence number is inserted into a predetermined amount of said payload.

In another embodiment of the present invention, said step of sending said prepared broadcast message, further includes the steps of: forming a connection between said group of intermediate compute nodes and said root compute node at each said group of intermediate compute node based upon said first packet; allocating a plurality of buffers at each group of intermediate nodes according to said root compute node's rank number; and receiving said first packet and each said subsequent packet in order at each said buffer at each said intermediate compute nodes.

In another embodiment of the present invention, the step of reforming said packet header further includes the step of: re-packetizing said packetized message, buffered at each said group of intermediate nodes, said re-packetizing includes replacing root node's rank number with said assigned rank number of each said intermediate compute node re-packetizing said packetized message in said first packet and all subsequent packets including said assigned rank number of each said intermediate compute node re-packetizing said packetized message in each subsequent packet header of said subsequent packets, wherein the re-packetizing of said broadcast message makes each set of intermediate compute nodes said virtual root nodes.

In another embodiment of the present invention, the step of repeating the steps of reforming provides that re-packetized message received at each said group of intermediate nodes or said group of leaf nodes is continued until each buffer of each compute node in the communicator matches said broadcast message.

In another embodiment of the present invention, wherein an available memory in said software header is determined by a log N bit(s) of said message in said buffer on said intermediate nodes packetizing or re-packetizing said packetized or re-packetized message and where N is a number of nodes in the system and said group number and said root node's rank number represent 2 log N bits of said software header in said first packet header and said subsequent packets are configured for said available memory is said software header of log N bits, which is said rank of each said intermediate nodes or each said subsequent intermediate node(s).

In another embodiment of the present invention, said software header a predetermined amount of available memory.

In another embodiment of the present invention, said sequence number a BCAST sequence number according to a MPI library function.

In another embodiment of the present invention, said group intermediate compute nodes include a protocol hander function for determining said connection slot for every compute node in the parallel computing system based upon said first packet header.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 2:
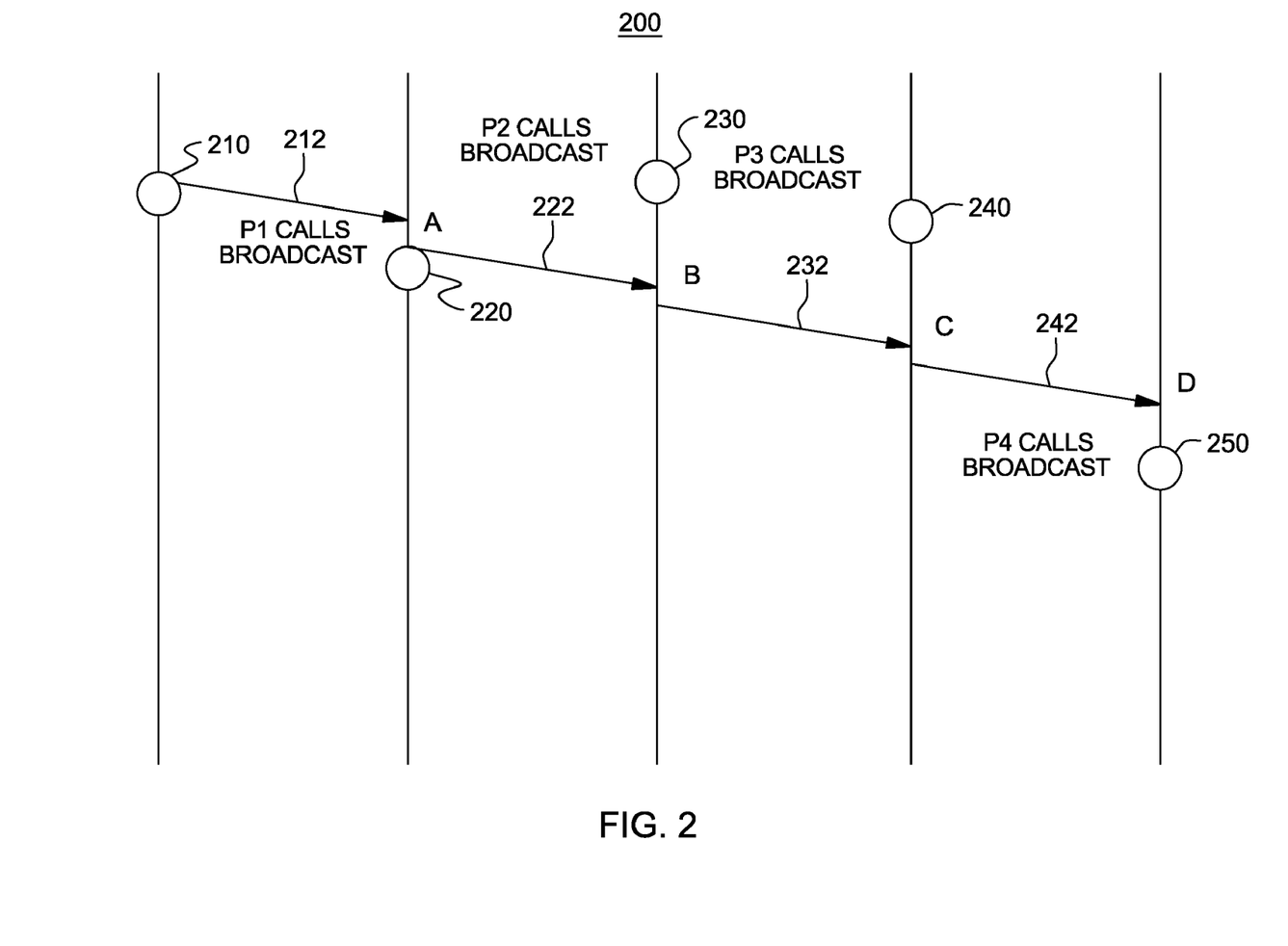
FIG. 2 is an illustration of an asynchronous broadcast call on a communicator in accordance with the present invention.

Referring to FIG. 2 is an example of an illustration of an asynchronous broadcast call on a communicator 200 in accordance with the present invention. As can been seen in FIG. 2, all processors 210, 220, 230, 240 and 250 begin their data transfers before all processors complete the broadcast call. In other words, data packets moves to all other destination nodes independent of when the processors initiate broadcasts. As can be seen in FIG. 2, a broadcast message may need to be handled unexpectedly on destination nodes P1 210 and P4 250. For example, processor P1 210 completes its data transfer at position A before P4 250 calls the broadcast at position C.

As will be explained in further detail with reference to the remaining figures, the present invention provides a novel mechanism for replicating a broadcast call by means of an asynchronous broadcast call on a communicator and particularly addresses the need for providing a mechanism on the receiving processors in a communicator to provide data packet order or context and to distinguish data packets from several incoming asynchronous broadcast messages. Otherwise, without the present invention each compute node would have to receive a broadcast message directly from the root compute node, since parallel computing systems can contain hundreds of thousands of compute nodes, each having more than one processor, a broadcast call would need to travel through continuously through numerous intermediate nodes and finally to the leaf compute nodes to completely replicate the data in a root processor's buffer to all processors in a given communicator. Particularly, in one aspect of the invention, there is provided a method of keeping track of asynchronous broadcast calls at various locations in a communicator and providing for distribution of broadcast messages in an orderly fashion.

IBM's Blue Gene/P™, described in co-pending application (U.S. patent application Ser. No. YOR920070356US1 (21263)), commonly assigned to International Business Machines Corporation, Armonk, N.Y. and entitled "Message Passing With A Limited Number Of DMA Byte Counters" discloses a Torus interconnect for application data communication. Broadcast operations can be implemented on the torus network. The network provides reliable delivery with message ordering. In Blue Gene/P™, processor core(s) sends messages on the network with a Direct Memory Access (DMA) engine. Processors post injection descriptors have the address of the send buffer and the number of bytes. The DMA engine packetizes the buffer and sends the packets on the network. Then the DMA allows the application software to specify up to four (4) bytes of information on each packet. These 4 bytes will uniquely identify the packet on the destination.

The Blue Gene/P™ message layer software uses one of these four bytes to store a protocol handler function, which will be invoked to process a packet on the destination. The remaining 3 bytes in Blue Gene/P™ packet header can be used by the application.

The system and method for providing an asynchronous broadcast call in a communicator where ordered delivery of data packets is maintained between compute nodes in a parallel computing system where packet header space is limited will now be described according to the preferred embodiments of the present invention. The proceeding explanation will first provide the basis structure of a communicator utilizing an asynchronous broadcast with respect to the absolute ranks of compute nodes, the connection slot assignments between compute nodes and message buffers allocation in individual compute nodes with respect to FIG. 3, according to a preferred embodiment of the present invention. Then with respect to FIG. 4-6, the forming of packet headers and transfer of the broadcast message between compute nodes is described, according to a preferred embodiment of the present invention.

Figure 3:
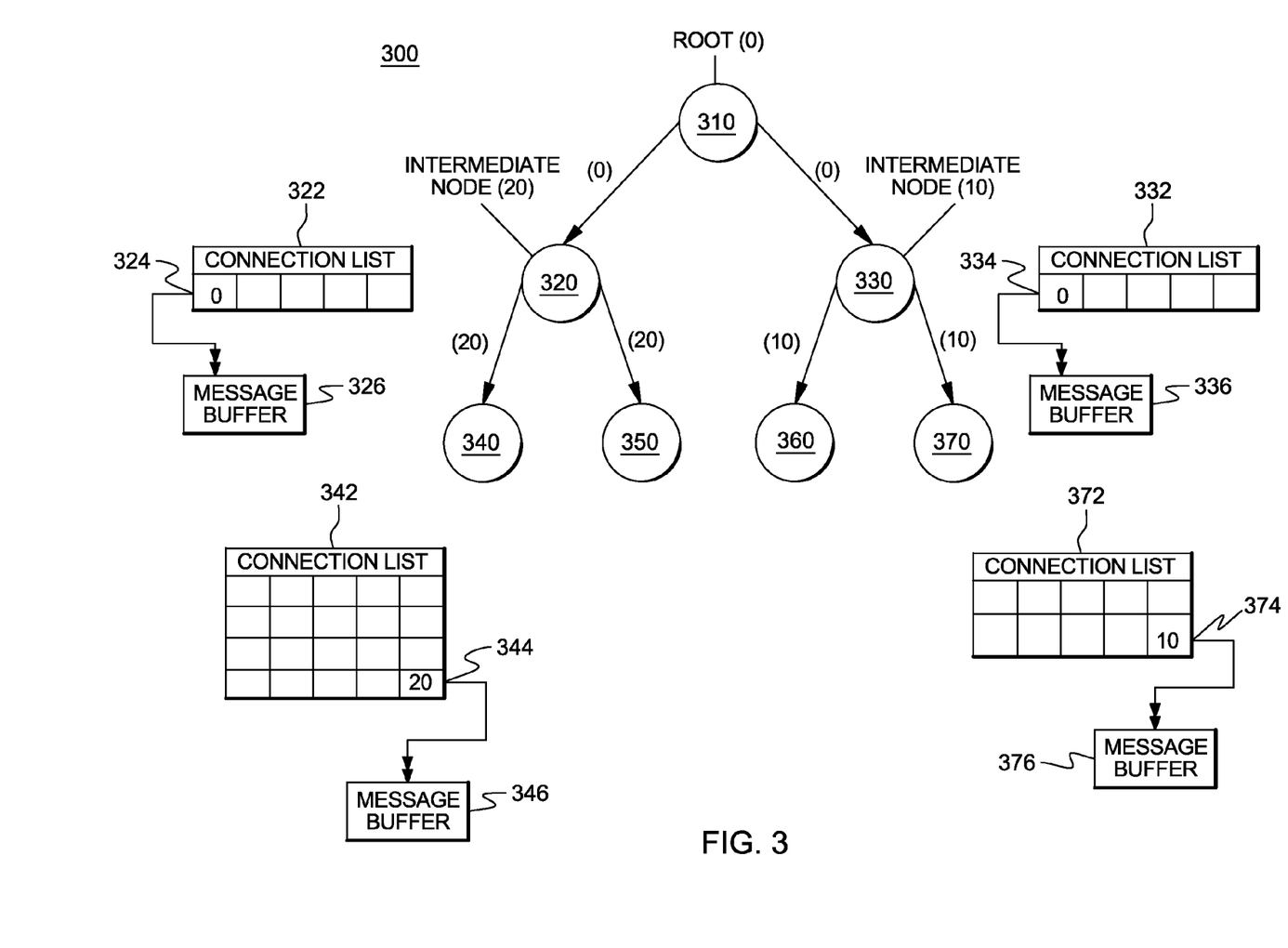
FIG. 3 illustrates an example of an asynchronous broadcast operation on a communicator, according to a preferred embodiment of the present invention.

FIG. 3 illustrates an example of an asynchronous broadcast operation 300 established under a predetermined communicator function presented in a spanning tree configuration, according to a preferred embodiment of the present invention. The asynchronous broadcast operation 300 depicts a single originating root compute node 310 issuing a broadcast call. Root compute node 310 sends a broadcast call to every other compute node in a communicator according to a global connection list (not shown). The global connection list is established prior to system operation and is hard-coded into a parallel system, (e.g. stored in main memory) or can be created once per run of a given application such as implemented in IBM's Blue Gene/P™. Alternatively, in other parallel computing systems, a global list could be stored in ROM and would be accessed once per partition boot. Abbreviated portions of the global connection list are shown in FIG. 3 as 322, 332, 342 and 372 in order to explain the method of connection between compute nodes. Those skilled in the art would know that other parallel systems could utilize a dynamic connection list and therefore the present invention is not limited to a hard-coded global connection list.

As can further be seen in FIG. 3, all other compute nodes in the communicator 320, 330, 340, 350, 360, and 370 have a message buffer 322, 332, 342, 352, 362, and 372 and connection nodes 324, 334, 344, 354, 364, and 374 based upon the same global connection list.

The communicator function is now shown in FIG. 3. As known to those skilled in the art, and as explained in the background section, a communicator function, according to MPI library defines the group of participating processes/processors and provides a context for operation. Moreover, the MPI library function MPI_COMM_WORLD defines absolute ranks within the communicator of compute nodes by assigning a root compute node and various intermediate nodes within the communicator. The communicator modularizes massively large parallel compute systems such as IBM's Blue Gene/P™ (100,000+compute nodes), for example, to ease software application programming. Those skilled in the art would know that other parallel systems are not limited to implementing the MPI message passing protocol and could utilize other means of assigning a group of compute nodes with various roles and contexts and therefore the present invention is not limited to a communicator.

In FIG. 3, compute node 310 has been assigned a rank node of (0) in the communicator representing the "root" and compute nodes 320 and 330 have been assigned a rank node of (10) and (20) representing "intermediate nodes," according to the rank order established by the communicator function. No rank has been assigned to leaf compute nodes 340, 350, 360 and 370 in FIG. 3, however, in alternate embodiments, the communicator would provide each leaf node a rank. Moreover, FIG. 3 depicts seven compute nodes for illustration purposes only, actually implementation of the present invention would involve communicators including any number of a compute nodes, on the order of tens of thousands of compute nodes.

As can be seen in FIG. 3, root compute node 310 sends a broadcast message to all destinations at the first level of the spanning tree. Other embodiments of the present invention could utilize other hierarchical structures such as binary search tree, heapsort or other recursive methods including iterative algorithms as know to those skilled in the art. In order to send the broadcast message in an efficient manner, the root compute node 310 packetizes the message by forming a first packet header contain information to distinguish the broadcast call from others send by roots in other communicators in a parallel computing system, as will become clarified when explain below in reference to FIGS. 4-5.

Intermediate compute nodes 320 and 330 obtain the broadcast message by forming a virtual connection with root compute node 310 according to each compute node's connection list 322 and 332, which are identical to one another. When an application starts up, such a broadcast call, all compute nodes are already connected to each other. In the case of the present invention, the intermediate nodes form a connection by reserving a slot in the connection list for the different root compute nodes associated with a communicator. These connections are logical connections based upon the context defined in a specific communicator as defined by the MPI library. For example, as shown in FIG. 3, at the first level of the spanning tree, the rank node of (0), assigned to the root compute node 310, is recognized at intermediate compute node's connection slot (0) 324 and 334. A virtual connection is formed at intermediate processor's connection slot (0) 324 and 334 based upon each compute node's connection list and, in accordance with the message layer software, the protocol handler function, is invoked to process a packet on destination compute nodes 320 and 330, as will be explained in further detail below in reference to FIGS. 4-6. Referring back to FIG. 3, each intermediate compute nodes 320 and 330 stores root processor's broadcast message in their respective message buffers 326 and 336.

In order to replicate the broadcast message through the communicator, intermediate compute nodes 320 and 330 continue to send the broadcast message received from root processor 310 down to the next set of compute nodes in the spanning tree. In that case, compute nodes 340 and 350 receive the broadcast message from intermediate compute node 320 and compute nodes 360 and 370 receive the broadcast message from intermediate compute node 330. As will be explained below in reference to FIGS. 4-5, intermediate compute nodes 320 and 330 re-packetize the broadcast message received from root compute node 310 utilizing their individual rank nodes (20) and (10) assigned by the communicator, to form a new packet header which will contain information to identify the root compute node as the sender, yet the new packet header will aid in continuing to replicate the root compute node's broadcast call throughout the spanning tree without the need for direct communicator with the root compute node.

As shown in the abbreviated global connection lists 342 and 372, compute nodes 340-350 and 360-370 will form a virtual connection, as described above, with their respective intermediate nodes 320 and 330 at connection slots (20) 344 and (10) 374, which enables connections to be formed based upon each compute node's individual connection list by the protocol handler function as discussed above. Each compute node 340-350 and 360-370, receives and stores the broadcast message stored in their respective intermediate compute node's message buffer 326 and 336 into their own respective message buffers 346 and 376.

Figure 4:
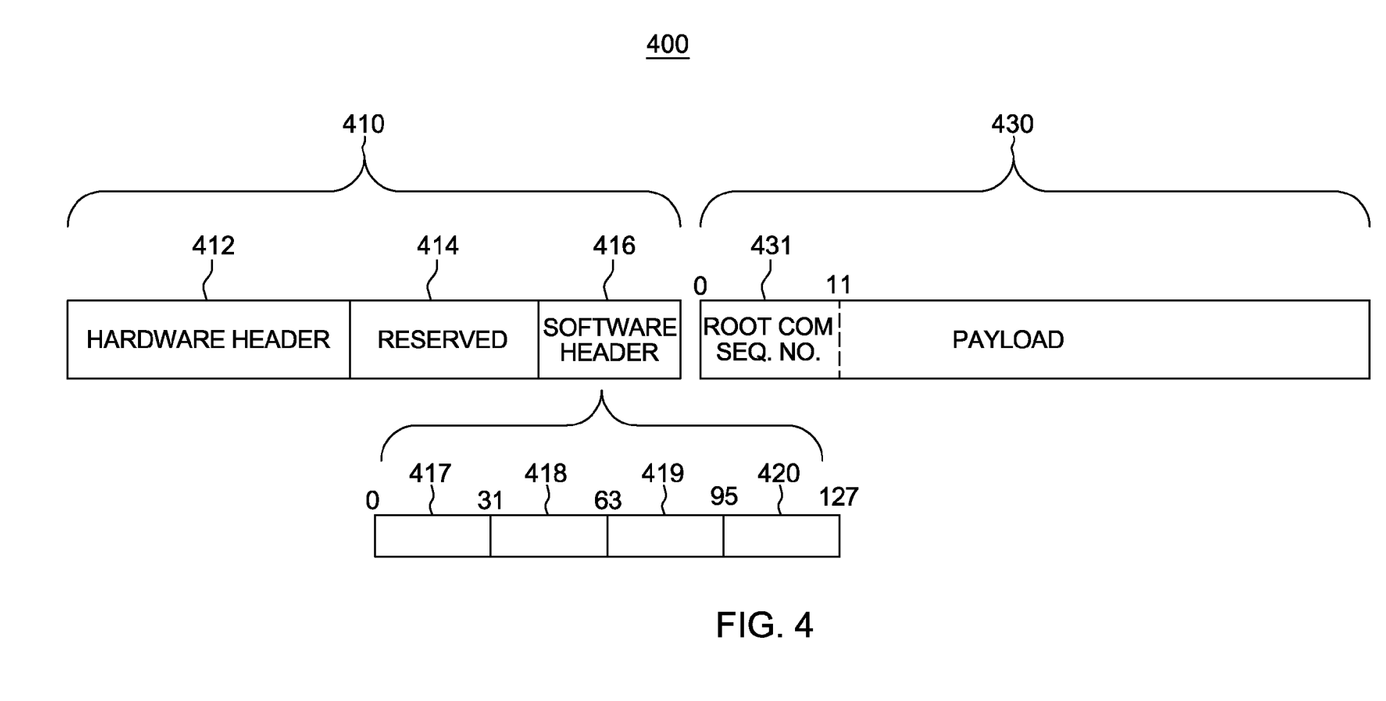
FIG. 4 illustrates an asynchronous packet header, according to a preferred embodiment of the present invention.

Now referring to FIG. 4, the forming of packet headers for asynchronous broadcasting message between compute nodes is described, according to a preferred embodiment of the present invention.

FIG, 4 illustrates an asynchronous broadcast packet 400, for transmitting a broadcast message, according to a preferred embodiment of the present invention. The asynchronous broadcast packet 400 contains a packet header 410 and a payload 430 configured for an asynchronous broadcast call operation. Asynchronous broadcast packet 400 contains a hardware header 412, which contains routing information, some reserved space 414 and a software header 420, which is specified by a given application. The software header 420 in the case of IBM's Blue Gene/P™ has 4-bytes of available memory. The present invention is not limited to a software header having 4-bytes of available memory and could have more available memory as known to those skilled in the ant. The first byte 417 is allocated to distinguish communications patterns (e.g. message Id No.). The remaining 3-bytes 418, 419 and 420 are used to store the rank of the root or intermediate node in the manner as explained below in reference to FIG. 5-6, below.

The payload 430 also carries the root rank identification number, which is inserted into the first packet when formed by the root compute node, as explained below in reference to FIG. 5.

To make a broadcast call globally unique, the present invention provides that each subsequent compute node down each branch of the spanning tree distinguish a data packet by a root or intermediate node, a communicator and the MPI library identifier BCAST sequence number, which are 3 log N bits of information in one example embodiment. Hence, 3 log N bits of information describes a function of three variables; the assigned compute or intermediate node's rank number, a group or communicator number and a sequence number, together with the number of nodes (N) in the system. According to a preferred embodiment of the present invention, a log N bit(s) of information is enough to distinguish asynchronous broadcast message(s) on intermediate nodes and the destination, where N is the number of nodes in the system. The log N bits also enable broadcast to be delivered in order. As described below, the first packet however will carry the communicator, root that is 2 log N bits and set up a connection state on each intermediate node and the remaining packets of the BCAST message will carry only log N bits, which is the rank of the intermediate node. The log N bits have to be allocated to each packet.

Now the operation of an algorithm providing asynchronous broadcast call in a communicator where ordered delivery of data packets is maintained between compute nodes in a parallel computing system where packet header space is limited will be explained in reference to FIGS. 3-6.

Figure 5:
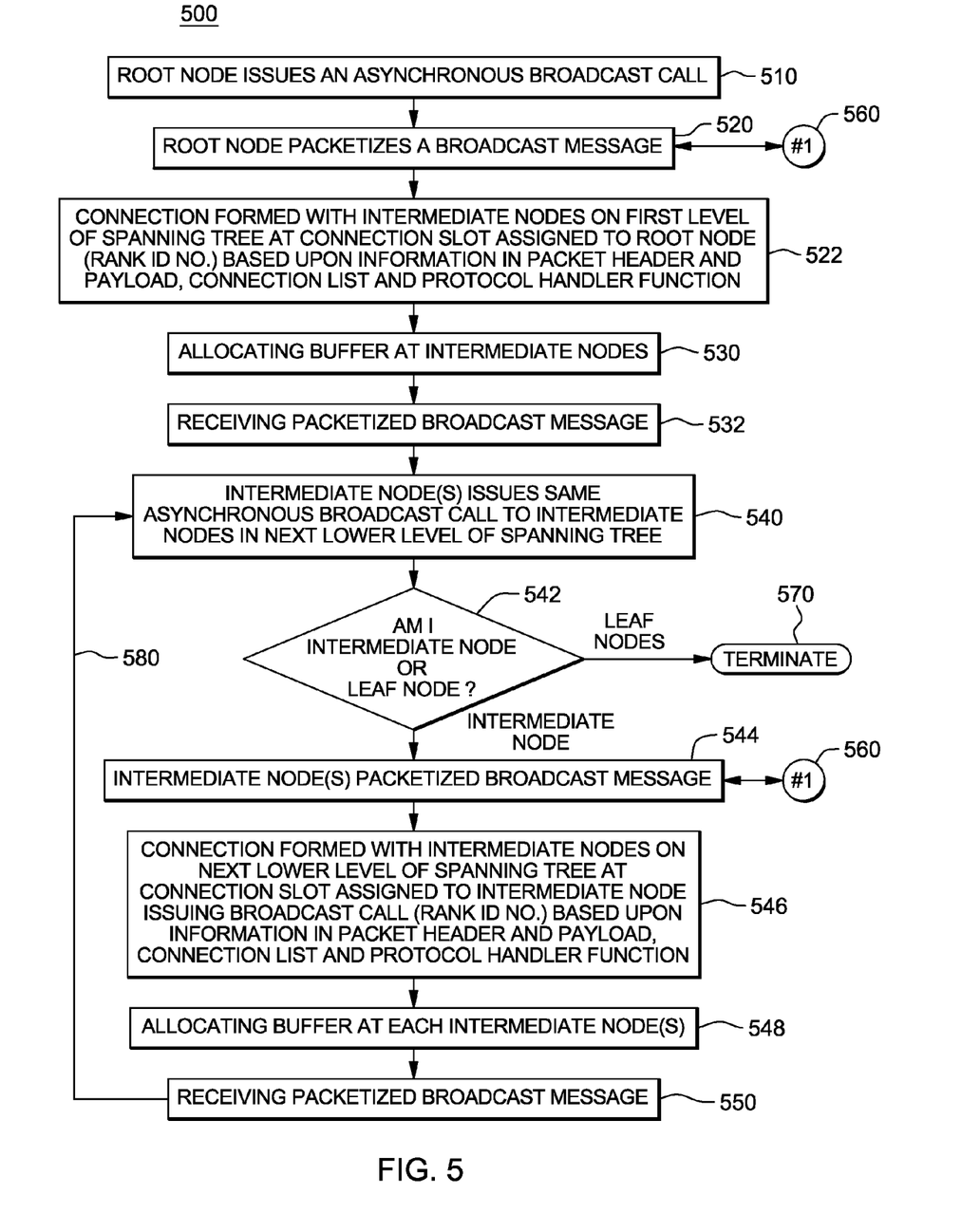
FIG. 5 depicts a flowchart of an asynchronous broadcast operation according to a preferred embodiment of the present invention.

FIG. 5 provides a flow diagram of the algorithm for providing asynchronous broadcast call in a communicator where ordered delivery of data packets is maintained between compute nodes in a parallel computing system where packet header space is limited 500, in a preferred embodiment of the present invention. Prior to initiating the first step of asynchronous broadcast call algorithm, 510, it is assumed that the parallel computing system is configured. As described above in FIG. 3, each of the seven-compute nodes shown have already formed a connection list with one connection slot for every other processor in the parallel computing system. In addition, the spanning tree has already been formed at this step and the ranks have already been assigned from the MPI library. Hence, the parallel computing system is configured into a communicator.

Figure 6:
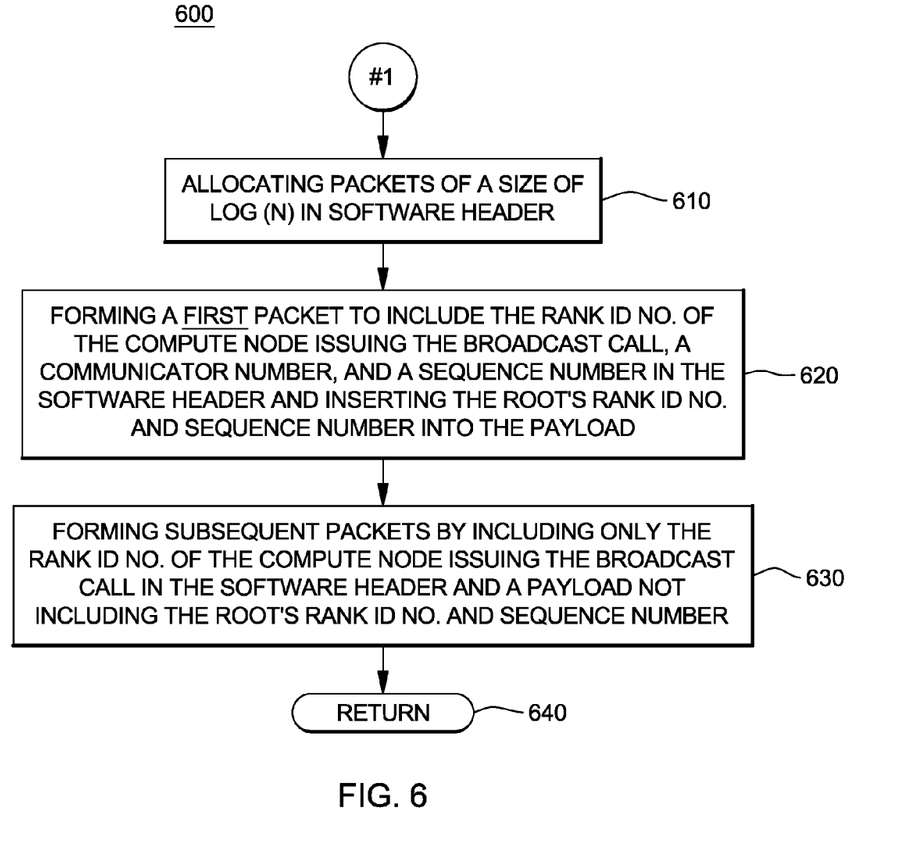
FIG. 6 depicts a flowchart describing the process of forming an asynchronous broadcast packet according to a preferred embodiment of the present invention.

As shown in step 510, root compute node 310 in FIG. 3 issues an asynchronous broadcast call to send a broadcast message. In step 520, the root compute node 310 or the DMA engine on the root processor(s) (not shown) packetizes this message and sends it packet after packet. FIG. 6 depicts a flowchart describing the process of forming an asynchronous broadcast packet according to a preferred embodiment of the present invention. The processing of forming an asynchronous broadcast packet is noted in step 520 and 544 and executed at 560 details how the root compute node 310 packetizes a broadcast message according to step 522, and the subroutine is called at 560.

As shown in FIG. 6,) the process of forming an asynchronous broadcast packet according to a preferred embodiment of the present invention begins by allocating packets of a size log (N), step 610, as explained above, in a predetermined section of a packet header. In one embodiment of the present invention the software header is utilized. As shown in FIG. 4, the software header 416 has 4-bytes of available memory as shown in bytes 417-420.

In step 620, in FIG. 6 with reference to FIG. 4, the first packet of the message is formed by inserting the root rank identification number into the second byte 418, the communicator identification number into the third byte 419 and a sequence number 420 (e.g. BCAST No.) into a fourth byte of the software header 416. As shown in FIG. 4, the root nodes' rank (0) and a sequence number is inserted into the first 12-bytes of the packet payload 431. Returning to FIG. 6, at step 630, subsequent packets are formed of a predetermined size, base upon the size of message that follows and has the rank of the compute node issuing the message in the 3-byte software header 416. Finally, step 640 returns to the main operation at reference marker #1 in FIG. 5.

Referring back to FIG. 5, in step 522, the root compute node 310 now connects with all destinations that are at the first level of the spanning tree in the broadcast call as illustrated in FIG. 3, where root compute node 310 connects with intermediate nodes 320 and 340. The abbreviated global connection lists 322 and 332 shown in FIG. 3, show that the destination has allocated connection slot (0) based upon connection slots 324 and 334, the rank identification number found in the packet payload 431 (shown in FIG. 4), and the protocol handler function, as described above (not shown).

In step 530 with reference to FIG.3, the intermediate compute nodes 320 and 330 allocate message buffers 326 and 336 for the arriving broadcast message via packet delivery in step 532. If the application has called the broadcast and posted a buffer for the broadcast, the intermediate compute nodes 320 and 330 can use that same buffer for the incoming message. The above steps ensure that the delivery of the broadcast call is received in order and matches the original set by the root compute node in a communicator.

Once the broadcast message is received at the intermediate nodes, it is sent to the next set of nodes at lower levels of the spanning tree (e.g. compute nodes 340-350 and 360-370) in step 540. However, prior to re-sending the broadcast call, the compute node needs to determine whether it is an intermediate node or a leaf node in step 542. If the compute node is a leaf node the broadcast call is finish at this node, as shown in step 570. On the other hand, if the compute node is an intermediate node a broadcast call is initiated.

A similar process of forming an asynchronous broadcast packet above in step 520 is now carried out in step 544. The only difference between calling subroutine 560 at step 520 versus 544 is the rank identification number of the compute node calling the broadcast call as seen in 620. Hence, the intermediate compute nodes are now "virtual root compute nodes," re-packetizing the broadcast message to lower levels of tree structure in FIG. 3, whereas the compute nodes in the lower level of the tree do not need to obtain the broadcast message from the actual root compute node's buffer but obtain the message from an intermediate compute node. In step 546, with reference to FIG.3, the intermediate compute nodes 320 and 330 now connects with all destinations that are at next lower level of the spanning tree in the broadcast call as illustrated in FIG. 3, where intermediate nodes 320 and 340 connect with leaf nodes 340-350 and 360-370, respectively. The abbreviated global connection lists 342 shared by leaf nodes 340 and 350 and connection list 372 shared by leaf nodes 360 and 370, show that the destination has allocated connection slot (20) or (10) based upon connection slots 344 and 374, the rank identification number found in the packet payload 431 (shown in FIG. 4), and the protocol handler function, as described above (not shown).

In step 548 with reference to FIG.3, the leaf compute nodes 340-350 and 360-370 allocate message buffers 346 and 376 for the arriving broadcast message via packet delivery in step 550. Leaf nodes 340-350 and 360-370 each have their own individual message buffers. FIG. 3 only depicts one connection list, one connection slot and message buffer for the sets of leaf compute nodes 340-350 and 360-370 to ease explanation of the present invention. As was explained above, if the application has called the broadcast and posted a buffer for the broadcast, the intermediate compute nodes 320 and 330 can use that same buffer for the incoming message. The above steps ensure that the delivery of the broadcast call is received in order and matches the original set by the root compute node in a communicator.

Loop 580 is provided to drill down the spanning tree during the asynchronous broadcast call to ensure that all leaf nodes and intermediate nodes receive the broadcast message, which matches the originally sent message.

For purposes of explanation herein, the system and method of the invention has assumed the following: messaging runtime provides ordered delivery; a broadcast is sent along a spanning tree from the root to all the destinations in the communicator; on each communicator, from each root all broadcasts use the same set of intermediate nodes.

While not shown in the present invention, each communicator has a specific topology or topological patterns such as two- or three-dimensional grids, which can have different optimizations. The present invention as described above can be implemented in any communicator regardless of the topological pattern of the communicator. In Blue Gene/P, for example, the present invention supports both a spanning tree broadcast and an optimized rectangular broadcast on a 3D Torus. It is understood that other implementations may additionally be provided without departing from the scope of this invention, as it will be understood by those skilled in the art.

As described above, according to the present invention, a system and method of providing a mechanism on the receiving compute nodes in the communicator to provide order or context to the data packets received from a broadcast call and to distinguish data packets from several incoming asynchronous broadcast messages. Moreover, since a parallel computing systems can contain hundreds of thousands of compute nodes a broadcast call in the present invention does not need to travel through numerous intermediate nodes to replicate the data in a root compute node's buffer to all compute nodes in a given communicator instead, the present invention provides a novel technique of providing that rank id information is squeezed into the 3-byte of the software header of packet headers. In turn, the entire broadcast message is not transferred from the root compute node to all compute nodes in a communicator but instead is replicated on several elected intermediate nodes which are then replicated to nodes in lower leaf nodes of a spanning tree.

As will be readily apparent to those skilled in the art, the present invention or aspects of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method for asynchronously broadcasting a message from a root compute node in a parallel computer system to each of interconnected intermediate compute nodes associated with a defined group of compute nodes in said parallel computer system, said parallel computer system providing a messaging infrastructure adapted to perform ordered delivery of packets, wherein a broadcast message includes a plurality of packets, said method comprising:

preparing a broadcast message at said root compute node to include a first packet including header information identifying said defined group and at least a connection identifier identifying a rank of said root compute node in said defined group, and, in each remaining packet of said plurality of packets, specifying the connection identifier of said broadcasting root compute node; and, broadcasting said message from said root compute node to a subsequent level of intermediate compute nodes associated with said group, and, at each of said intermediate compute nodes using said header for allocating storage for receiving said broadcast message packets based on said header information included in said first packet;

receiving said plurality of packets of said message from said root compute node;

re-packetizing said message by replacing, in each said plurality of remaining packets other than said header packet, the connection identifier of said root compute node with a rank number of the current intermediate compute node that received the packet thereby reducing a size of said packet, and, re-broadcasting said message with header packet and subsequent packets of reduced size to a next successive level of intermediate compute nodes associated with said group, wherein an intermediate compute node of a subsequent level allocates storage for receiving said re-broadcast header packet and subsequent packets of reduced size from the prior intermediate level compute node, thereby increasing performance of processing said message.

2. The method for asynchronously broadcasting a message from a root compute node in a parallel computer system, in claim 1, wherein the group of compute nodes is configured into a hierarchical structure comprising one or more of:

a spanning tree, a binary search tree, a heapsort or other recursive methods including iterative algorithms.

3. The method for asynchronously broadcasting a message from a root compute node in a parallel computer system in claim 1, wherein said root compute node, said intermediate compute nodes and a leaf compute node of said group are assigned a rank number, said method farther comprising:

populating a connection list with said ranks of said root compute node, said intermediate compute nodes and said leaf compute node, said connection list defining a connection slot between each compute node in said group.

4. The method for asynchronously broadcasting a message from a root compute node in a parallel computer system in claim 3, wherein said step of preparing said broadcast message farther comprises the steps of:

packetizing a first packet header, by said root compute node, said broadcasting messages into said header packet and said payload, wherein said header packet includes said assigned root rank number, a group number; a first sequence number;

packetizing a first payload, said first payload includes a root communicator number and a first sequence number;

packetizing all other packet headers including said root rank number and a second sequence number.

5. The method for asynchronously broadcasting a message from a root compute node in a parallel computer system in claim 4, wherein said packet header further including a hardware header, a reserved space, a software header, said method further comprising:

inserting said root rank number, said group number, and said first sequence number into said software header.

6. The method for asynchronously broadcasting a message from a root compute node in a parallel computer system in claim 4, wherein said root number and said sequence number is inserted into a pre-determined number of bytes of said payload.

7. The method for asynchronously broadcasting a message from a root compute node in a parallel computer system in claim 4, wherein the step of sending said prepared broadcast message, further includes the steps of:

forming a connection between said group of intermediate compute nodes and said root compute node at each said group of intermediate compute nodes based upon said first packet;

allocating a plurality of buffers at each group of intermediate compute nodes according to said root compute node's rank number; and receiving said first packet and each said subsequent packet in order at each said buffer at each said intermediate compute nodes.

8. The method for asynchronously broadcasting a message from a root compute node in a parallel computer system in claim 7, wherein the re-packetizing of said broadcast message renders each set of intermediate compute nodes as virtual root compute nodes.

9. The method for asynchronously broadcasting a message from a root compute node in a parallel computer system in claim 5, wherein an available memory in said software header is a function of said assigned compute node's rank number, said group number, and said sequence number and the number of nodes in the system.

10. A computer program product for asynchronously broadcasting a message from a root compute node in a parallel computer system to each of interconnected intermediate compute nodes associated with a defined group of compute nodes in said parallel computer system, said parallel computer system providing a messaging infrastructure adapted to perform ordered delivery of packets, wherein a broadcast message includes a plurality of packets, the computer program product comprising:

a storage medium readable by a processing circuit and storing instructions for execution by the processing circuit for performing a method comprising:

preparing a broadcast message at said root compute node to include a first packet including header information identifying said defined group and at least a connection identifier identifying a rank of said root compute node in said defined group, and, in each remaining packet of said plurality of packets, specifying the connection identifier of said broadcasting root compute node; and, broadcasting said message from said root compute node to a subsequent level of intermediate compute nodes associated with said group, and, at each of said intermediate compute nodes
  using said header for allocating storage for receiving said broadcast message packets based on said header information included in said first packet:
  receiving said plurality of packets of said message from said root compute node;
  re-packetizing said message by replacing, in each said plurality of remaining packets other than said header packet, the connection identifier of said root compute node with a rank number of the current intermediate compute node that received the packet thereby reducing a size of said packet, and,
  re-broadcasting said message with header packet and subsequent packets of reduced size to a next successive Level of intermediate compute nodes associated with said group,
  wherein an intermediate compute node of a subsequent level allocates storage for receiving said re-broadcast header packet and subsequent packets of reduced size from the prior intermediate level compute node, thereby increasing performance of processing said message.

11. The computer program storage device, in claim 10, wherein said subset of the system is a hierarchical structure and can be a spanning tree, a binary search tree, a heapsort or other recursive methods including iterative algorithms.

12. The computer program storage device, in claim 10, wherein a rank of said root compute node, said intermediate compute nodes and said leaf compute node are provided in a connection list defining a connection slot between each compute node in said subset of the system.

13. The computer program storage device, in claim 12, wherein said step for preparing said broadcast message further comprises:
  packetizing a first packet header, by said root compute node, said broadcasting messages into said header packet and said payload, wherein said header packet includes said assigned root rank number, a group number; a first sequence number;
  packetizing a first payload, said first payload includes a root communicator number and a first sequence number;
  packetizing all other packet headers including said root rank number and a second sequence number.

14. The computer program storage device, in claim 10, wherein said packet header farther including a hardware header, a reserved space, a software header and said root rank number, said group number, and said first sequence number being inserted into said software header.

15. The computer program storage device, in claim 14, wherein said root number and said sequence number is inserted into a predetermined amount of said payload.

16. The computer program storage device, in claim 10, wherein the step of sending said prepared broadcast message, further comprising:
  forming a connection between said group of intermediate compute nodes and said root compute node at each said group of intermediate compute nodes based upon said first packet;
  allocating a plurality of buffers at each group of intermediate compute nodes according to said root compute node's rank number; and
  receiving said first packet and each said subsequent packet in order at each said buffer at each said intermediate compute nodes.

17. The computer program storage device, in claim 16, wherein the re-packetizing of said broadcast message renders each set of intermediate compute nodes as virtual root compute nodes.

18. The computer program storage device, in claim 17, wherein steps of reforming are repeated such that re-packetized message received at each said group of intermediate compute nodes or said group of leaf nodes is continued until each buffer of each compute node in the group matches said broadcast message.

19. The computer program storage device, in claim 14, wherein an available memory in said software header is a function of said assigned compute node's rank number, said group number, and said sequence number and a number of nodes in the system.

* * * * *